US012572730B2

(12) United States Patent
Yarlagadda et al.

(10) Patent No.: US 12,572,730 B2
(45) Date of Patent: Mar. 10, 2026

(54) SYSTEMS AND METHODS FOR GENERATING ACCESSIBLE INTERFACE CONTENT USING A MACHINE LEARNING FRAMEWORK

(71) Applicant: Wells Fargo Bank, N.A., San Francisco, CA (US)

(72) Inventors: Ramesh Yarlagadda, Charlotte, NC (US); Sarah W. Phelps, Annapolis, MD (US); Ravi K. Maganti, Eden Prairie, MN (US); John Andrew Chuprevich, Davidson, NC (US); Bradford A. Shea, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 197 days.

(21) Appl. No.: 18/584,702

(22) Filed: Feb. 22, 2024

(65) Prior Publication Data

US 2025/0272471 A1     Aug. 28, 2025

(51) Int. Cl.
*G06F 40/106* (2020.01)

(52) U.S. Cl.
CPC .................................. *G06F 40/106* (2020.01)

(58) Field of Classification Search
None
See application file for complete search history.

(56) References Cited

U.S. PATENT DOCUMENTS

| | | | |
|---|---|---|---|
| 10,142,459 B2 | 11/2018 | Wohlert | |
| 10,303,526 B2 * | 5/2019 | Urim ..................... | G06F 3/1454 |
| 10,762,280 B2 | 9/2020 | Bradley | |
| 10,779,724 B2 | 9/2020 | Goodsitt | |
| 12,293,177 B1 * | 5/2025 | Roberts .................... | G06F 8/65 |
| 2021/0096826 A1 * | 4/2021 | Duggal ............. | G06Q 30/0283 |
| 2022/0357841 A1 * | 11/2022 | Hugh ................... | G06F 3/0482 |
| 2023/0083894 A1 * | 3/2023 | Duggal .................. | G06F 8/316 |
| | | | 717/107 |
| 2023/0409290 A1 * | 12/2023 | Duggal ........... | G06Q 10/06311 |

* cited by examiner

*Primary Examiner* — Toan H Vu
(74) *Attorney, Agent, or Firm* — K&L Gates LLP

(57)               ABSTRACT

Systems, apparatuses, methods, and computer program products are disclosed for providing accessible interface content. An example method includes receiving base interface content comprising one or more interface content components and determining a user population of interest and a platform of interest. The example method further includes generating one or more interface feature sets using a pre-processing model. The example method further includes modifying one or more interface content components for each interface feature set using feature modification models. The example method further includes generating modified interface content using a multimodal model based on the one or more interface feature sets and providing the modified interface content.

20 Claims, 9 Drawing Sheets

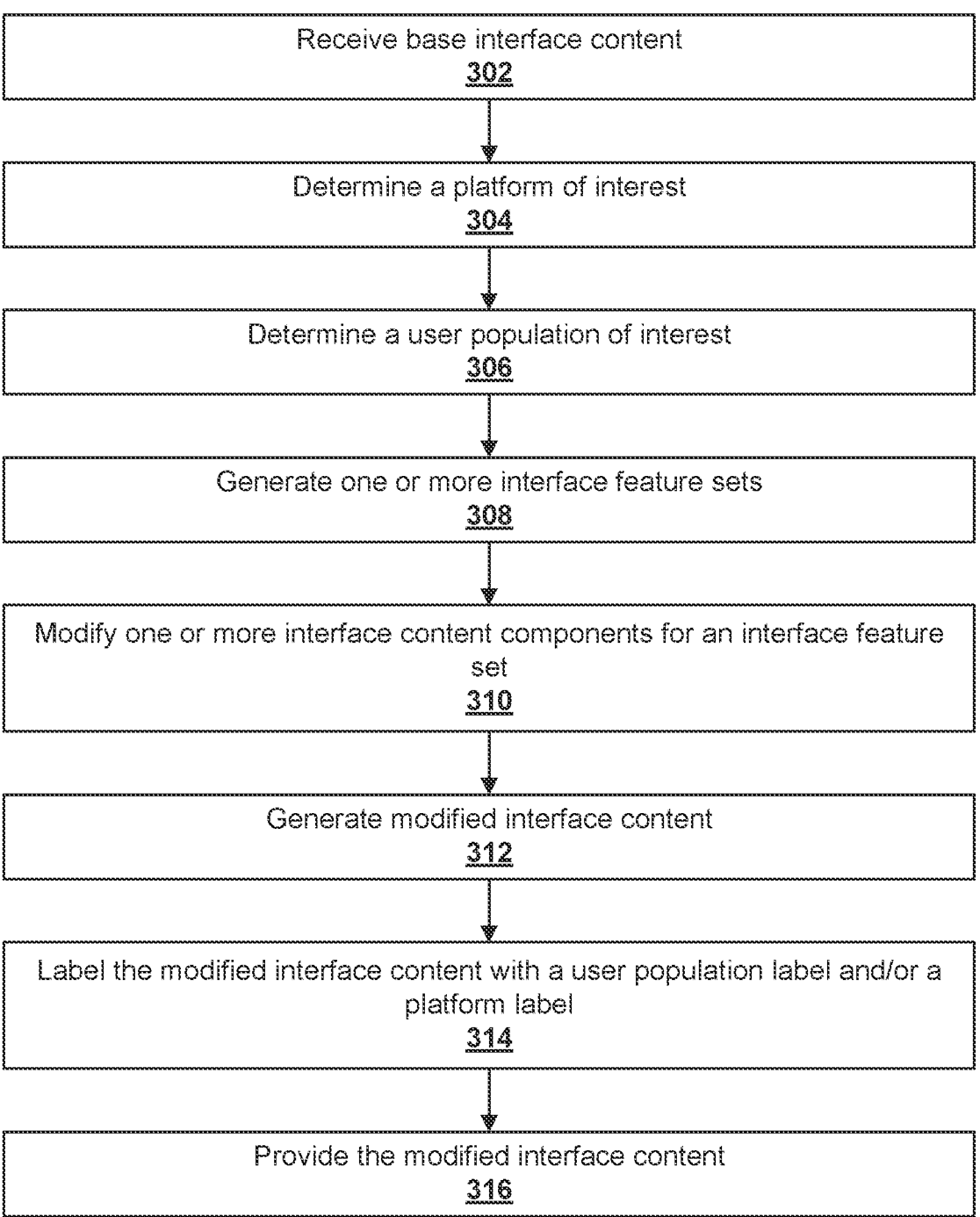

Receive base interface content
302

Determine a platform of interest
304

Determine a user population of interest
306

Generate one or more interface feature sets
308

Modify one or more interface content components for an interface feature set
310

Generate modified interface content
312

Label the modified interface content with a user population label and/or a platform label
314

Provide the modified interface content
316

FIG. 3

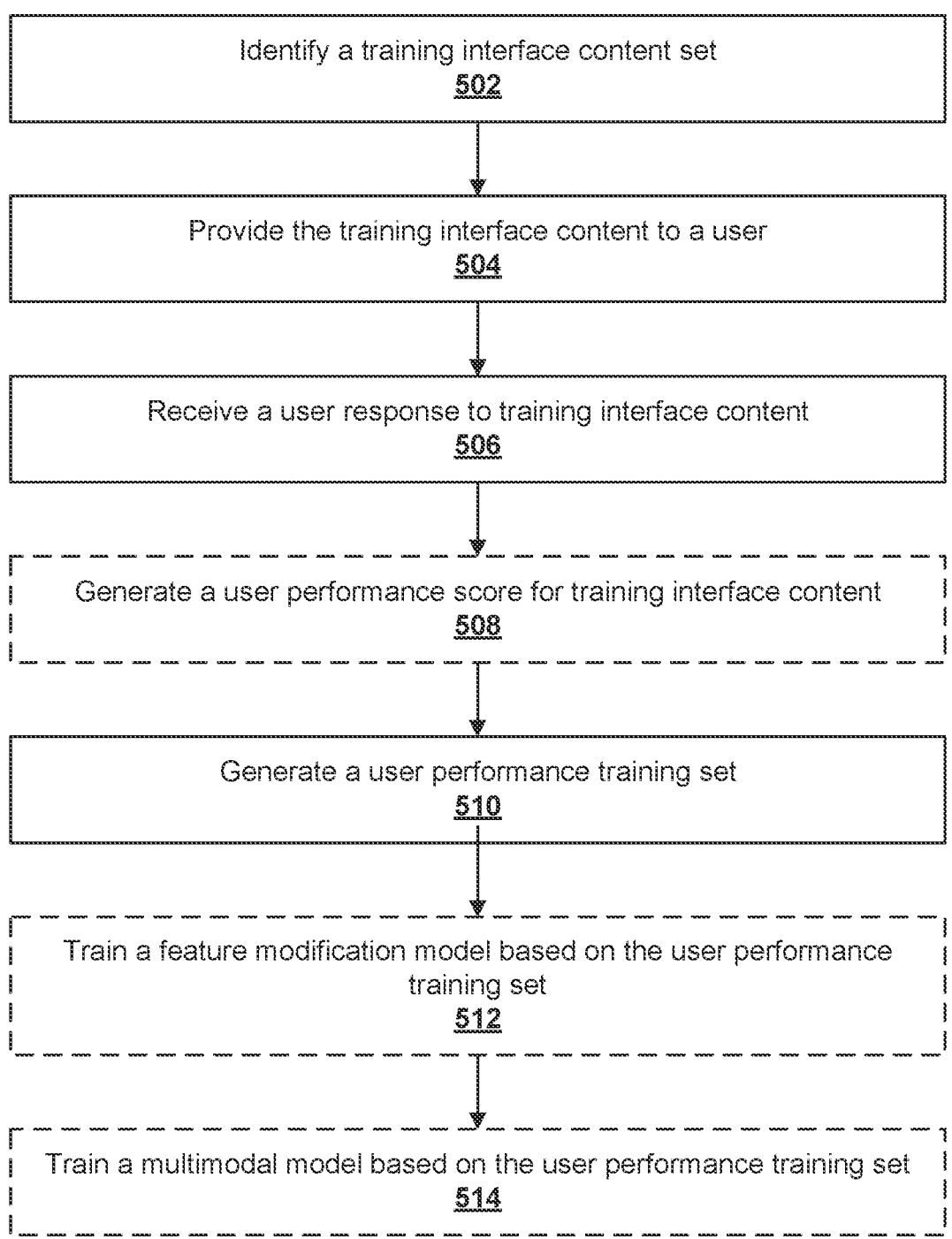

Identify a training interface content set
502

Provide the training interface content to a user
504

Receive a user response to training interface content
506

Generate a user performance score for training interface content
508

Generate a user performance training set
510

Train a feature modification model based on the user performance training set
512

Train a multimodal model based on the user performance training set
514

FIG. 5

Receive a user request for interface content
602

Determine a user preference set for the user
604

Determine a user population for the user
606

Determine a platform for the user
608

Access modified interface content corresponding to the user population and/or the platform
610

Provide modified interface content
612

SYSTEMS AND METHODS FOR GENERATING ACCESSIBLE INTERFACE CONTENT USING A MACHINE LEARNING FRAMEWORK

BACKGROUND

Electronic and information technology may be subject to compliance standards. For example, the American with Disabilities Act (ADA) requires that digital technology be accessible to individuals with disabilities. Additionally, the Web Content Accessibility Guidelines (WCAG) defines technical standards for web accessibility and has been used as guidelines for determining ADA compliance of digital and/or online content.

BRIEF SUMMARY

As mentioned above, online content is subject to compliance standards such as WCAG. The ADA has used WCAG as a guideline for evaluating ADA compliance of web design and online content. Non-compliance to digital accessibility standards may expose an organization or entity to legal processing under the ADA, potentially leading to substantial fines and harm to the organization's reputation. Thus, it is imperative for organizations to generate and provide online content that is accessible to all users.

Although WCAG has laid a foundation for online content accessibility, these guidelines are rigid and fail to take into account individual accessibility preferences of a user. WCAG additionally does fully address the needs of all individuals with disabilities. For example, WCAG currently has limited guidelines for users with cognitive disabilities. Additionally, even WCAG guidelines for more robustly covered areas, such as visual or hearing impairments, still fail to consider individual preferences of users that may have varying levels of visual and/or hearing impairments. Furthermore, WCAG is primarily designed for web content such that it fails to address other technology platforms, such as native mobile applications or desktop applications.

In contrast to evaluating the accessibility of online content using conventional WCAG standards, example embodiments described herein allow for the generation and provision of tailored, accessible interface content that has been generated to address the accessibility preferences of a user or group of users. As such, example embodiments described herein do away with the conventional one-size-fits-all approach of conventional standards and allow for the provision of interface content that is tailored to the accessibility preferences of the individual user. Furthermore, example embodiments described herein contemplate generating modified interface content that is optimized for various technology platforms (e.g., web content, native mobile applications, desktop applications, etc.). In this way, the interface content may be presented to the user in an accessible manner regardless of the technology platform the user is using the access the interface content.

Accordingly, the present disclosure sets forth systems, methods, and apparatuses that generate and provide accessible interface content for a variety of users. In doing so, example embodiments described herein allow for tailored interface content that is accessible to a variety of users on various platforms. In doing so, example embodiments described herein foster inclusivity and enhance user experience for users who may experience difficulties interacting with conventional interface content. Additionally, interface content that is accessible allows users to more easily interact with the interface content and perceive and understand said interface content presented to them. This may allow for increased user satisfaction and engagement by providing interface content that addresses specific user needs and preferences. This is particularly important in the digital age as digital content is quickly becoming the preferred method of interaction such that information accessibility is crucial. Furthermore, example embodiments described herein may aid in enhancing any user's experience with interface content, not only users that experience difficulties or disabilities, as interface content is tailored to particular technology platforms to optimize the user interaction experience.

Example embodiments described herein may receive base interface content and determine platforms of interest and user populations of interest. Interface feature sets that include one or more interface content components may then be generated by a pre-processing model and provided to a particular feature modification model. The feature modification model may leverage machine-learning and/or deep learning techniques to modify one or more values, settings, configurations, parameters, etc. of an interface content component in a manner that improves the accessibility of the interface content component for a given user population and/or platform. A multimodal model may receive each interface feature set from the various feature modification models and may generate modified interface content. The generated modified interface content may be tailored to provide optimal accessibility of the interface content components for the given user population on the particular platform.

Furthermore, a user may provide a user request for interface content. A user preference set and platform may be determined for the user. A user population may be determined for the user such that example embodiments described herein may identify modified interface content that corresponds to the user population determined for the user and the platform for the user. This modified interface content may then be provided to the user. In this way, the user is provided with tailored, accessible interface content that considers the user preferences of the user and the current platform used to access the interface content.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 3 illustrates an example flowchart for generating modified interface content associated with a user population label, in accordance with some example embodiments described herein.

FIG. 5 illustrates an example flowchart for training a feature modification model and/or a multimodal model, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers, programmable automation controllers, industrial computers, desktop computers, personal data assistants, laptop computers, tablet computers, smart books, palm-top computers, personal computers, smartphones, wearable devices (such as headsets, smart-watches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
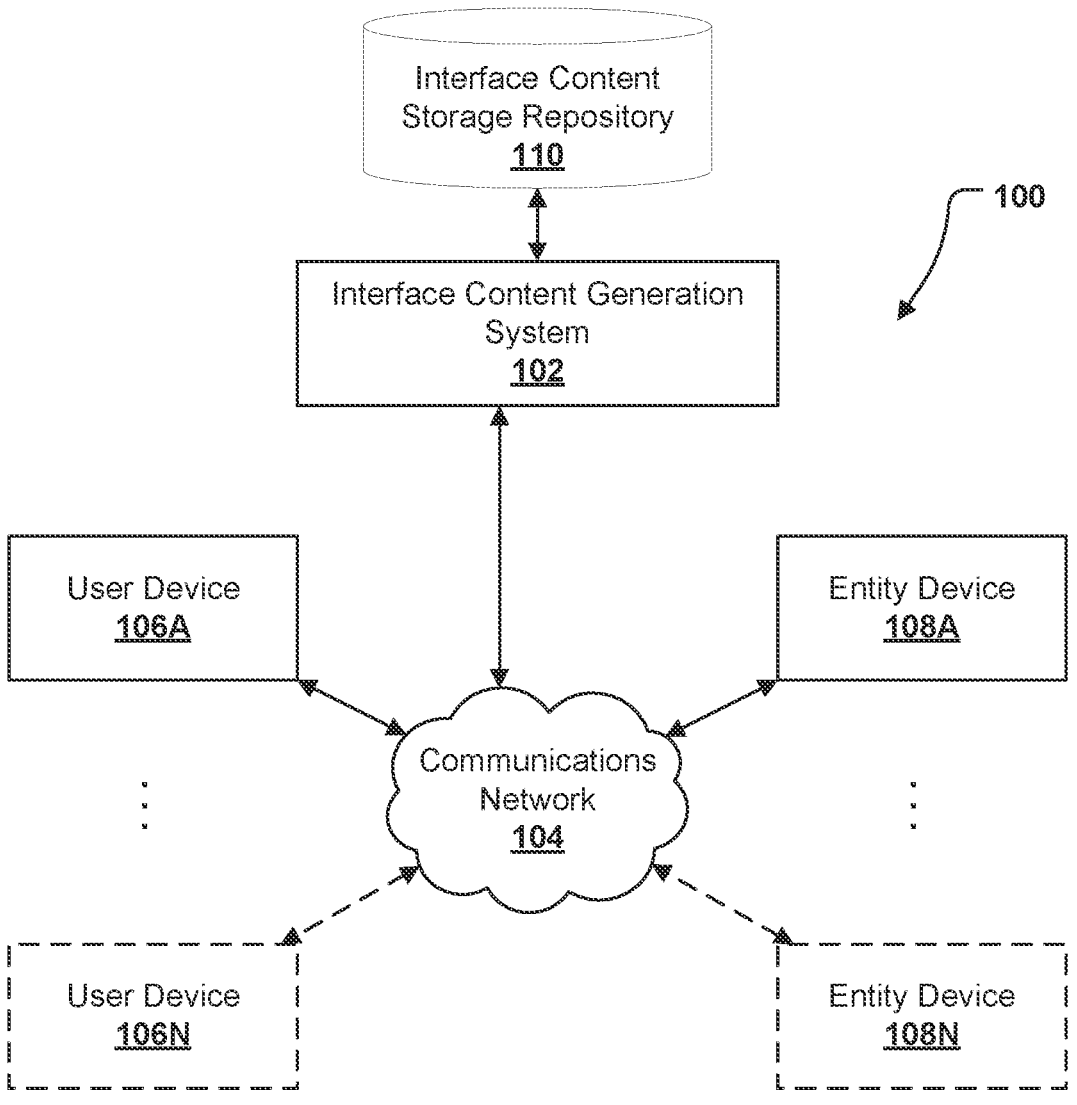
FIG. 1 illustrates a system in which some example embodiments may be used generating and providing accessible interface content.

Example embodiments described herein may be implemented using any of a variety of computing devices or servers. To this end, FIG. 1 illustrates an example environment 100 within which various embodiments may operate. As illustrated, an interface content generation system 102 may receive and/or transmit information via communications network 104 (e.g., the Internet) with any number of other devices, such as one or more of user devices 106A-106N and/or entity devices 108A-108N.

The interface content generation system 102 may be implemented as one or more computing devices or servers, which may be composed of a series of components. Particular components of the interface content generation system 102 are described in greater detail below with reference to apparatus 200 in connection with FIG. 2.

In some embodiments, the interface content generation system 102 further includes an interface content storage repository 110 that comprises a distinct component from other components of the interface content generation system 102. The interface content storage repository 110 may be embodied as one or more direct-attached storage devices (such as hard drives, solid-state drives, optical disc drives, or the like) or may alternatively comprise one or more Network Attached Storage devices independently connected to a communications network (e.g., communications network 104). In some embodiments, the interface content storage repository 110 may host the software executed to operate the interface content generation system 102. The interface content storage repository 110 may store information relied upon during operation of the interface content generation system 102, such as various models (e.g., pre-processing models, feature modification models, multimodal models, and/or the like), data sets (e.g., user population preference set, user preference sets, training interface content sets, user performance training sets, and/or the like) that may be used by the interface content generation system 102, data and documents to be analyzed using the interface content generation system 102, or the like. In some embodiments, the interface content storage repository 110 may store modified interface content generated by the interface content generation system. In addition, the interface content storage repository 110 may store control signals, device characteristics, and access credentials enabling interaction between the interface content generation system 102 and one or more of the user devices 106A-106N or entity devices 108A-108N.

The one or more user devices 106A-106N and the one or more entity devices 108A-108N may be embodied by any computing devices known in the art. The one or more user devices 106A-106N and the one or more entity devices 108A-108N need not themselves be independent devices, but may be peripheral devices communicatively coupled to other computing devices.

Although FIG. 1 illustrates an environment and implementation in which the interface content generation system 102 interacts indirectly with a user via one or more of user devices 106A-106N and/or entity devices 108A-108N, in some embodiments users may directly interact with the interface content generation system 102 (e.g., via communications hardware of the interface content generation system 102), in which case a separate user device 106A-106N and/or entity device 108A-108N may not be utilized. Whether by way of direct interaction or indirect interaction via another device, a user may communicate with, operate, control, modify, or otherwise interact with the interface content generation system 102 to perform the various functions and achieve the various benefits described herein.

Example Implementing Apparatuses

Figure 2:
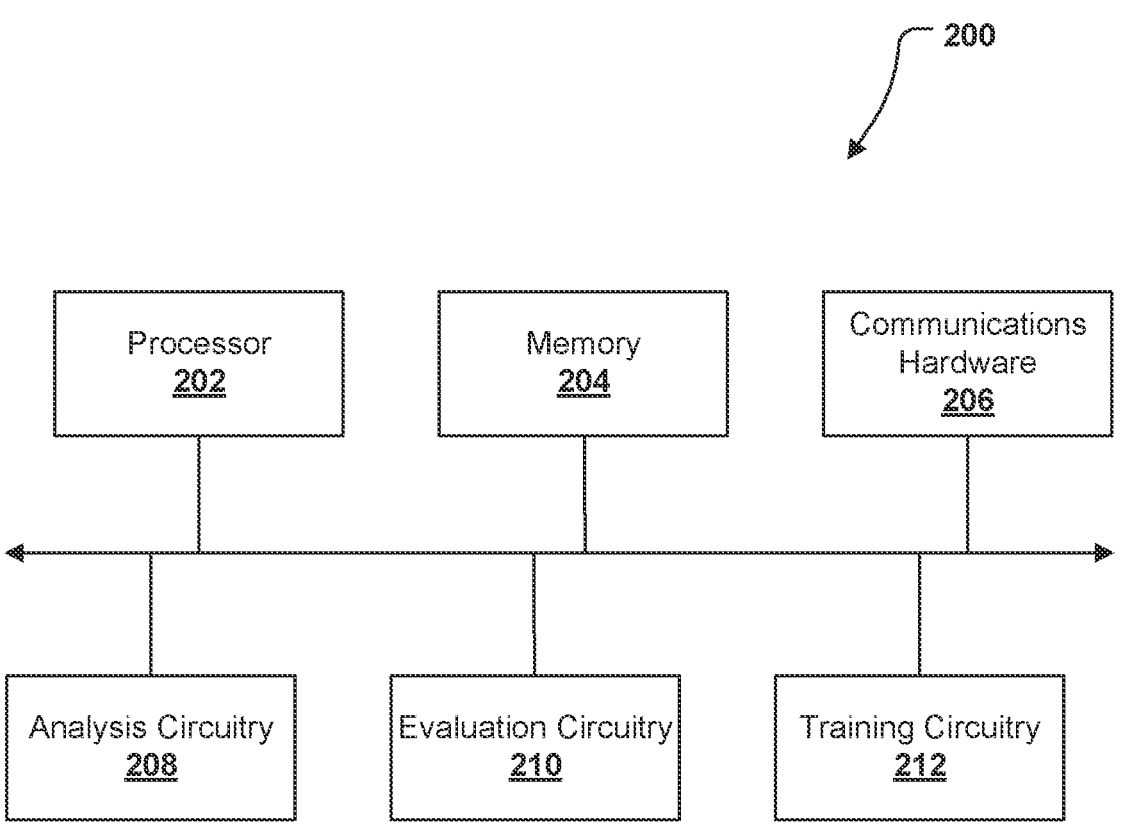
FIG. 2 illustrates a schematic block diagram of example circuitry embodying a system device that may perform various operations in accordance with some example embodiments described herein.

The interface content generation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-6. As illustrated in FIG. 2, the apparatus 200 may include processor 202, memory 204, communications hardware 206, analysis circuitry 208, evaluation circuitry 210, and training circuitry 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, desktop application, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an analysis circuitry 208 that is configured to determine a user population of interest, generate one or more interface feature sets, modify one or more interface content components, generate modified interface content, and/or the like. In some embodiments, the analysis circuitry 208 is further configured to identify a feature modification model, modify one or more interface content components, determine an accessibility score for an interface content component, determine whether an accessibility score satisfies an accessibility score threshold, determine a platform of interest, label modified interface content, determine a user preference set for a user, determine a user population for the user, access modified interface content, and/or the like. The analysis circuitry 208 may utilize processor 202, memory 204, or any other hardware component included in the apparatus 200 to perform these operations, as described in connection with FIGS. 3-6 below. The analysis circuitry 208 may further utilize communications hardware 206 to gather data from a variety of sources (e.g., user devices 106A-106N, entity device 108A-108N, or interface content storage repository 110, as shown in FIG. 1).

In addition, the apparatus 200 further comprises evaluation circuitry 210 that is configured to identify a training interface content set, receive a user response to provided training interface content, generate a user performance score, generate a user performance training set, and/or the like. The evaluation circuitry 210 may utilize processor 202, memory 204, or any other hardware component included in the apparatus 200 to perform these operations, as described in connection with FIGS. 3-6 below. The evaluation circuitry 210 may further utilize communications hardware 206 to gather data from a variety of sources (e.g., user devices 106A-106N, entity device 108A-108N, or interface content storage repository 110, as shown in FIG. 1).

Further, the apparatus 200 further comprises training circuitry 212 that is configured to train a feature modification model and/or a multimodal model. The training circuitry 212 may utilize processor 202, memory 204, or any other hardware component included in the apparatus 200 to perform these operations, as described in connection with FIGS. 3-6 below. The training circuitry 212 may further utilize communications hardware 206 to gather data from a variety of sources (e.g., user devices 106A-106N, entity device 108A-108N, or interface content storage repository 110, as shown in FIG. 1).

Although components 202-212 are described in part using functional language, it will be understood that the particular implementations necessarily include the use of particular hardware. It should also be understood that certain of these components 202-212 may include similar or common hardware. For example, the analysis circuitry 208, evaluation circuitry 210, and training circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the analysis circuitry 208, evaluation circuitry 210, and training circuitry 212 may leverage processor 202, memory 204, or communications hardware 206 as described above, it will be understood that any of analysis circuitry 208, evaluation circuitry 210, and training circuitry 212 may include one or more dedicated processor, specially configured field programmable gate array, or application specific interface circuit to perform its corresponding functions, and may accordingly leverage processor 202 executing software stored in a memory (e.g., memory 204), or communications hardware 206 for enabling any functions not performed by special-purpose hardware. In all embodiments, however, it will be understood that analysis circuitry 208, evaluation circuitry 210, and training circuitry 212 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

EXAMPLE OPERATIONS

Turning to FIGS. 3-6, example flowcharts are illustrated that contain example operations implemented by example embodiments described herein. The operations illustrated in FIGS. 3-6 may, for example, be performed by system device of interface content generation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, analysis circuitry 208, evaluation circuitry 210, training circuitry 212, and/or any combination thereof. It will be understood that user interaction with the interface content generation system 102 may occur directly via communications hardware 206, or may instead be facilitated by a separate entity device 108A-108N, as shown in FIG. 1, and which may have similar or equivalent physical componentry facilitating such user interaction.

Example Operations for Generating Accessible Modified Interface Content

Turning first to FIG. 3, example operations are shown for generating modified interface content associated with a user population label and a platform label. As shown by operation 302, the apparatus 200 includes means, such as processor 202, memory 204, communications hardware 206, or the like, for receiving base interface content. In some embodiments, communications hardware 206 may be configured to receive base interface content. In particular, the communications hardware 206 may receive base interface content from an entity device (e.g., any one of entity devices 108A-108N). In some embodiments, the base interface content may be executable and/or may cause associated interface content components to be rendered on an associated display. Said otherwise, the base interface content may be configured with software instructions that cause associated interface content components to render on a display screen. For example, base interface content may be a webpage, an application page, and/or the like. In some embodiments, the base interface content may further be associated with an endpoint and/or uniform resource locator (URL) that may be used to access the base interface content.

In some embodiments, the communications hardware 206 may receive the base interface content in response to a new digital content request. A new digital content request may be a request for new or updated digital content to be made available on an online platform associated with apparatus 200. For example, an entity that manages apparatus 200 may have a website that includes various webpages, tools, and other digital content. A software or web developer associated with apparatus 200 (e.g., an employee of the entity that manages apparatus 200) may generate new (or updated) digital content for the website. However, before publishing the new digital content to the website such that is accessible or publicly available, the developer may provide the communications hardware 206 with a new digital content request that includes the new digital content. In some embodiments, the new digital content is the base interface content. The new digital content request may be indicative for the base interface content to be processed by apparatus 200 to generate modified interface content in accordance with user population preferences for one or more user populations. In this way, the developer need only provide a single instance of new digital content and apparatus 200 may generate modified interface content that is optimized for different user populations.

The base interface content may include any number of interface content components. In some embodiments, interface content components may be assigned an interface content component type and/or an interface content component subtype. Interface content component types may be indicative of the broader functionality the interface content component serves for the base interface content. For example, an interface content component type may include a structure interface content component type, a styling interface content component type, an interactivity interface content component type, a visual interface content component type, a textual interface content component type, a navigation interface content component type, and/or a plugin interface content component type. A structure interface content component type may be assigned to interface content components (e.g., Hypertext Markup Language (HTML)) that provide the structure of the interface content components and defines various portions of the other base interface content. A styling interface content component type may be assigned to interface content components (e.g., a Cascading Style Sheet (CSS)) that control the visual presentation of other interface content components (e.g., layout, colors, fonts, spacing, and the like). An interactivity interface content component may be assigned to interface content components (e.g., JavaScript) configured to handle user interactivity with some interface content components (e.g., form submissions, animations, user events such as clicking or keyboard input, or the like). A visual interface content component type may be assigned to interface content components (e.g., images, videos, and audio) of various formats (e.g., joint photographic experts group (JPG/JPEG), portable network graphics (PNG), graphics interchange format (GIF), motion picture experts group advanced video coding (MP4), web media file (WebM), and/or the like) that control visual presentation. A textual interface content component type may be assigned to interface content components that supply text information to the user. A navigation content component may be assigned to interface content components that are associated with hyperlinks to aid the user with navigating the website. A plugin interface content component type may be assigned to interface content components that may add more complex features to the website, such as slideshows, chatbots, analytics tools, or the like.

Additionally, each interface content component may be assigned an interface content component subtype that is indicative of the function of the particular interface content component within the interface content component type. For example, an interface content component that depicts a single image may be assigned an image interface content component subtype.

In some embodiments, the received interface content components may already be labelled with the interface content component type and/or interface content component subtypes. Alternatively, the base interface content may be configured in accordance with a predefined structure such that the interface content component type and/or interface content component subtype may be determined by analysis circuitry 208 and/or subsequent models that process the base interface content (e.g., a pre-processing model, a feature modification model, a multimodal model, and/or the like).

Furthermore, interface content components may be associated with one or more values, parameters, settings, configurations, and/or the like. By way of example, an interface content component may be an image and thus, may be assigned a visual interface content component type and an image interface content component subtype. The interface content component may include values for one or more pixels associated with the image. As another example, the interface content component may be a screen reader and thus, may be assigned an interactivity interface content component type and a screen reader interface content component subtype. The screen reader may include settings such as the reader tone, a reader pitch, a reader volume, a reader speed, and/or other auditory settings. As yet another example, the interface content component may be textbox text and thus, may be assigned a textual interface content component type and a textbox interface content component subtype. The textbox text may include characters that form the textbox text, font size for each text character, font style for each character, font color for each character, a font spacing between characters, and/or the like. As yet another example, the interface content component may be a CSS page structure and thus, may be assigned a styling interface content component type and CSS page interface content component subtype. The CSS page structure may include the various layout components of an HTML page, such as the position of various website components within a layout. As yet another example, the interface content component may be a HTML page structure and thus, may be assigned a structure interface content component type and HTML page interface content component subtype. The HTML page structure may include reference to one or more HTML objects or other components included on a website page.

As shown by operation 304, the apparatus 200 includes means, such as processor 202, memory 204, communications hardware 206, analysis circuitry 208, or the like, for determining a platform of interest. In some embodiments, the communications hardware 206 may also receive an indication of one or more platforms of interest from an entity device (e.g., any one of entity devices 108A-108N), such as in a new digital content request. Thus, the new digital content request may include an indication of one or more platforms for which modified interface content is to be generated. The inclusion of multiple platforms of interest may allow for modified interface content to be generated for user populations across many different platforms for a single new digital content request. In an instance in which multiple platforms are of interest, the analysis circuitry 208 may determine a platform of interest by selecting a platform of interest from the platforms of interest not yet associated with modified interface content. The analysis circuitry 208 may perform operations 304-316 for each platform of interest such that modified interface content is generated for each user population of interest within each platform of interest. In this way, modified interface content may be optimized both for a particular platform as well as for a user population. This may be particularly useful in instances in which a user accessing digital content does not have a registered account and/or known user preferences. In such a scenario, the modified interface content presented to such a user may still be optimized for the particular platform used to access the digital content.

A platform of interest may correspond to a category technology platforms that may be used to display, render, or otherwise allow access to modified interface content for users. Each platform may be associated with configurations, settings, parameters, options, and/or the like that describe how digital content is rendered within the particular platform. For example, a platform of interest may include a web browser, a native mobile application, and/or a desktop application. It will be appreciated that any number of platforms with various levels of granularity can be contemplated.

As shown by operation 306, the apparatus 200 includes means, such as processor 202, memory 204, communications hardware 206, analysis circuitry 208, or the like, for determining a user population of interest. In some embodiments, the communications hardware 206 may also receive an indication of one or more user populations of interest from an entity device (e.g., any one of entity devices 108A-108N), such as in a new digital content request. Thus, the new digital content request may include an indication of one or more user populations for which modified interface content is to be generated. The inclusion of multiple user population of interest may allow for modified interface content to be generated for multiple user populations for a single new digital content request. In an instance in which multiple user populations are of interest, the analysis circuitry 208 may determine a user population of interest by selecting a user population of interest from the multiple user populations of interest not yet associated with modified interface content. The analysis circuitry 208 may perform operations 306-316 for each user population of interest in the multiple user populations of interest such that modified interface content is generated for each user population of interest.

In some embodiments, analysis circuitry 208 may determine a user population of interest for a particular platform of interest and may repeat this process for each platform of interest. However, it will be appreciated that alternatively, a user population of interest may first be determined and a platform of interest may be determined subsequently such that analysis circuitry 208 determines a technology platform of interest for a particular user population of interest and may be repeated this process for each user population of interest. Said otherwise, operation 304 and 306 may occur in any order.

A user population of interest may correspond to a category of users that include one or more users that share similar preferences with respect to configurations, settings, parameters, options, and/or the like for digital content. It will be appreciated that any number of user populations with various levels of granularity can be contemplated. Furthermore, users included in a user population need not have a uniform medical diagnosis and may simply have similar preferences such that the individual user is included within a user population. By way of example, a user may be included in a low visibility user population due to his/her preferences that are similar to users with low visibility but may not themselves experience visual impairment. The grouping and assignment of users and user populations will be described in greater detail in FIGS. 5 and 6.

In some embodiments, a user population of interest may additionally include a default user population. A default user population may be a category directed to generic or non-specific users. The default user population may be used in scenarios where user preferences of a user accessing modified interface content are not known.

As shown by operation 308, the apparatus 200 includes means, such as processor 202, memory 204, analysis circuitry 208, or the like, for generating one or more interface feature sets. The analysis circuitry 208 may receive the base interface content from the communications hardware 206 and may generate the one or more interface feature sets based on the interface content. An interface feature set may be associated with an interface feature type. In some embodiments, an interface feature type may include an audio interface feature type, a visual interface feature type, and a language interface feature type. The interface feature type associated with the interface feature set may be indicative of the format and/or content of included base interface content included in a given interface feature set. Additionally, the interface feature type associated with the interface feature set may control subsequent processing of the interface feature set, as described in further detail below.

In some embodiments, the analysis circuitry 208 may be configured to use a pre-processing model to generate the one or more interface feature sets. In some embodiments, the pre-processing model may be a machine learning or rules-based model that is configured to prepare and/or base interface content into interface feature sets that can be processed by individual feature modification models. Additionally, the pre-processing model may perform data cleaning, data normalization, data scaling, and/or any other operations on the interface content components to prepare the interface content components for processing by feature modifications model. In some embodiments, the pre-processing model may encode the interface content components such as by using one-hot encoding techniques, label encoding techniques, and/or the like.

Additionally, the pre-processing model may additionally receive a population of interest as input. In some embodiments, the pre-processing model may encode the population of interest, such as by using one-hot encoding techniques, label encoding techniques, and/or the like.

Furthermore, the pre-processing model may additionally receive a platform of interest as input. In some embodiments, the pre-processing model may encode the platform of interest, such as by using one-hot encoding techniques, label encoding techniques, and/or the like.

In some embodiments, the pre-processing model may be configured to generate an interface feature set for each of a defined set of interface feature types. Each interface feature type may additionally be associated with a corresponding feature modification model. The pre-processing model may be configured to generate an interface feature set to include one or more interface content components from the received base interface content. In some embodiments, each of the interface content components included in the base interface content are included in an interface feature set.

Alternatively, in some embodiments, the analysis circuitry 208 may be configured to include particular interface content components in an interface content components, such as interface content components of a particular interface content component type and/or interface content component subtype. For example, for an interface feature set associated with a visual interface feature type, the analysis circuitry 208 may be configured to include interface content components that are assigned to an interface content component types of a structure interface content component type, a styling interface content component type, an interactivity interface content component type, a visual interface content component type, a textual interface content component type, a navigation interface content component type, and/or a plugin interface content component type. As another example, for an interface feature set associated with an audio interface feature type, the analysis circuitry 208 may be configured to include interface content components that are assigned to an interactivity interface content component type, a visual interface content component type, a textual interface content component type, and/or a navigation interface content component type. As another example, for an interface feature set associated with a language interface feature type, the analysis circuitry 208 may be configured to include interface content components that are assigned to a structure interface content component type, an interactivity interface content component type, a visual interface content component type, a textual interface content component type, and/or a navigation interface content component type. In this way, the pre-processing model may be configured to include only the most relevant interface content components within a particular interface feature set, thus reducing the amount of computational resources expended by feature modification models.

As shown by operation 310, the apparatus 200 includes means, such as processor 202, memory 204, analysis circuitry 208, or the like, for modifying one or more interface content components for an interface feature set. Once the analysis circuitry 208 has generated the one or more interface feature sets, analysis circuitry 208 may modify the one or more interface content components for an interface feature set. The interface content components may be modified in a manner that improves their accessibility to users within the user population of interest. Furthermore, the interface content components may be modified to additionally optimize their accessibility within the platform of interest.

In some embodiments, the analysis circuitry 208 may be configured to modify the one or more interface content components using a feature modification model. In particular, the pre-processing model may provide an interface feature set of the one or more interface feature sets and the user population of interest to a feature modification model that is associated with an interface feature type that corresponds to the interface feature type of the received interface feature set. The feature modification model may then be configured to process the interface feature set and may modify one or more interface content components based on the user population of interest.

A feature modification model may be a model that is configured to modify one or more interface content components of an interface feature set based on a user population of interest. As described in greater detail in FIG. 5, a feature modification model may be trained based on user performance data. Thus, a feature modification model may be trained to identify content component preferences for users within a given user population and may evaluate received interface content components for the user population in view of these learned preferences. Additionally, the feature modification model may be configured to process the platform of interest and may evaluate the received interface content components for the platform in view of learned user populations preferences associated with these platforms. In some embodiments, a feature modification model may be a deep learning model, machine learning model, and/or a rules-based model.

In some embodiments, the type of machine learning model for a feature modification model may be dependent upon the interface feature type associated with the feature modification model. In doing so, the inclusion of multiple feature modification models allow for multi-faceted user preferences to be evaluated and accommodated. For example, a feature modification model associated with a visual interface feature type may be a convolutional neural network (CNN), a series of autoencoders, an image segmentation model, an object detection model (e.g., regions with CNN, you only look one model, a single shot multibox detector), a generative adversarial network, and/or the like. As another example, a feature modification model associated with an audio interface feature type may be a CNN, recurrent neural network (RNN), a deep belief network, a series of autoencoders, a GAN, a transformer model, a hidden Markov model, and/or the like. As another example, a feature modification model associated with a language interface feature type may be a natural language processing (NLP) model, an RNN model, a long short-term memory (LSTM) model, a transformer-based model (e.g. bidirectional encoder representations from transformers (BERT), generative pre-trained transformer (GPT), text-to-text transfer transformer), a support vector machine (SVM), a random forest, a CNN, a clustering model, and/or the like.

Figure 4:
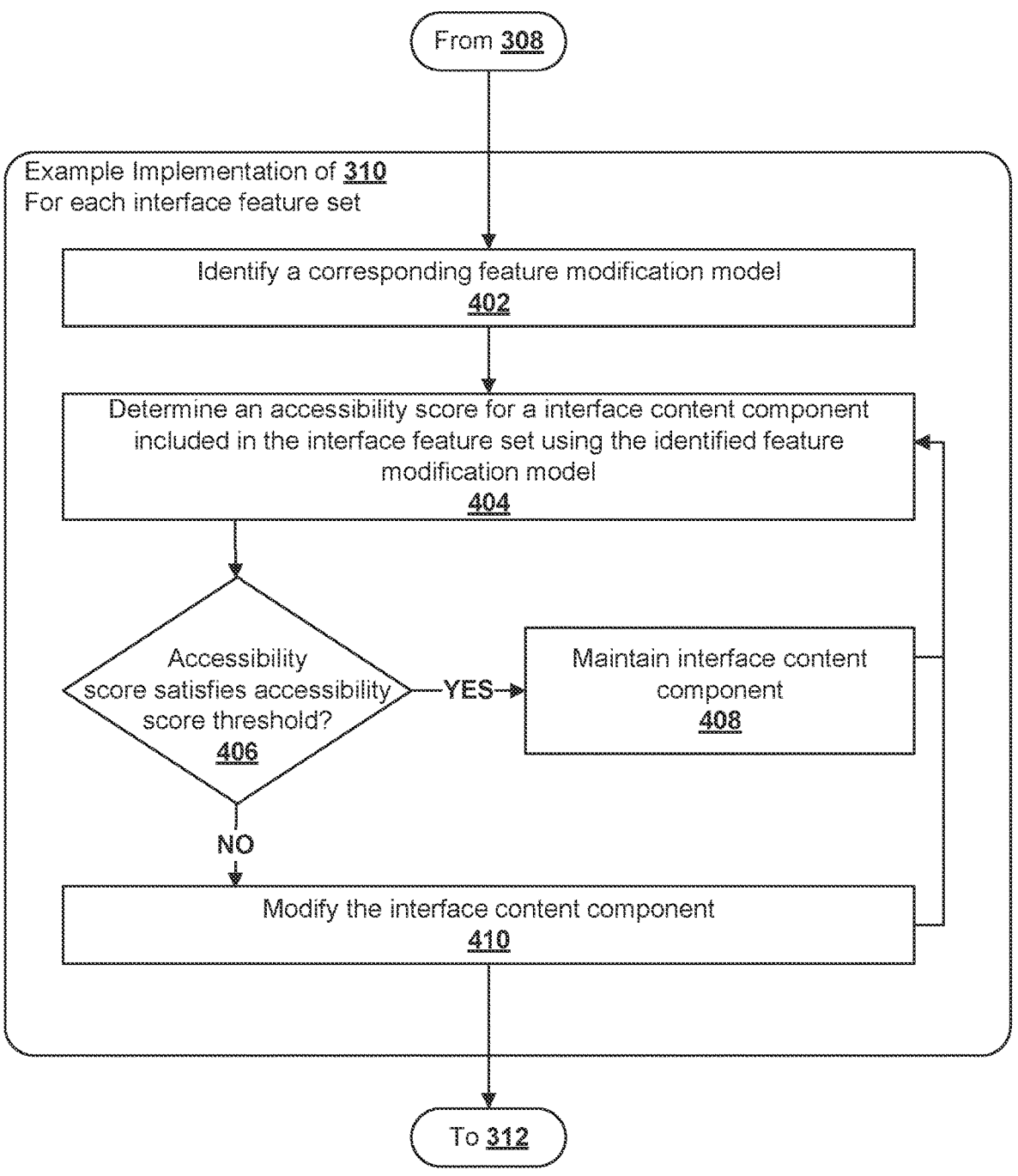
FIG. 4 illustrates an example flowchart for generating modified interface content, in accordance with some example embodiments described herein.

In some embodiments, operation 310 may be performed in accordance with the operations described by FIG. 4. Turning now to FIG. 4, example operations are shown for generating modified interface content. Each of operation 402-410 may be performed for each interface feature set of the one or more interface feature sets.

As shown by operation 402, the apparatus 200 includes means, such as processor 202, memory 204, analysis circuitry 208, or the like, for identifying a corresponding feature modification model. As described above, the analysis circuitry 208 may use a feature modification model to modify the one or more interface content components of an interface feature set. In some embodiments, once the pre-processing model has generate the one or more interface feature sets, which are each associated with a respective interface feature type, the pre-processing model (or analysis circuitry 208) may identify a feature modification model that for each interface feature set. In particular, for a given interface feature type, the pre-processing model may identify a feature modification model that is associated with a same or corresponding interface feature type as the interface feature set. Thus, the pre-processing model may provide the interface feature set to the identified feature modification model. Additionally, the pre-processing model may provide the population of interest and/or platform of interest to the identified feature modification model.

As shown by operation 404, the apparatus 200 includes means, such as processor 202, memory 204, analysis circuitry 208, or the like, for determining an accessibility score for an interface content component included in the interface feature set using the identified feature modification model. Once analysis circuitry 208 has selected a corresponding feature modification model, the analysis circuitry 208 may use the feature modification model to determine an accessibility score for an interface content component included in the interface feature set. In particular, the pre-processing model may provide the interface feature set, the user population of interest, and/or the platform of interest to the identified feature modification model. The feature modification model may then be configured to process each interface content component included in the interface feature set and determine an accessibility score for said interface content components for the given user population.

Figure 6:
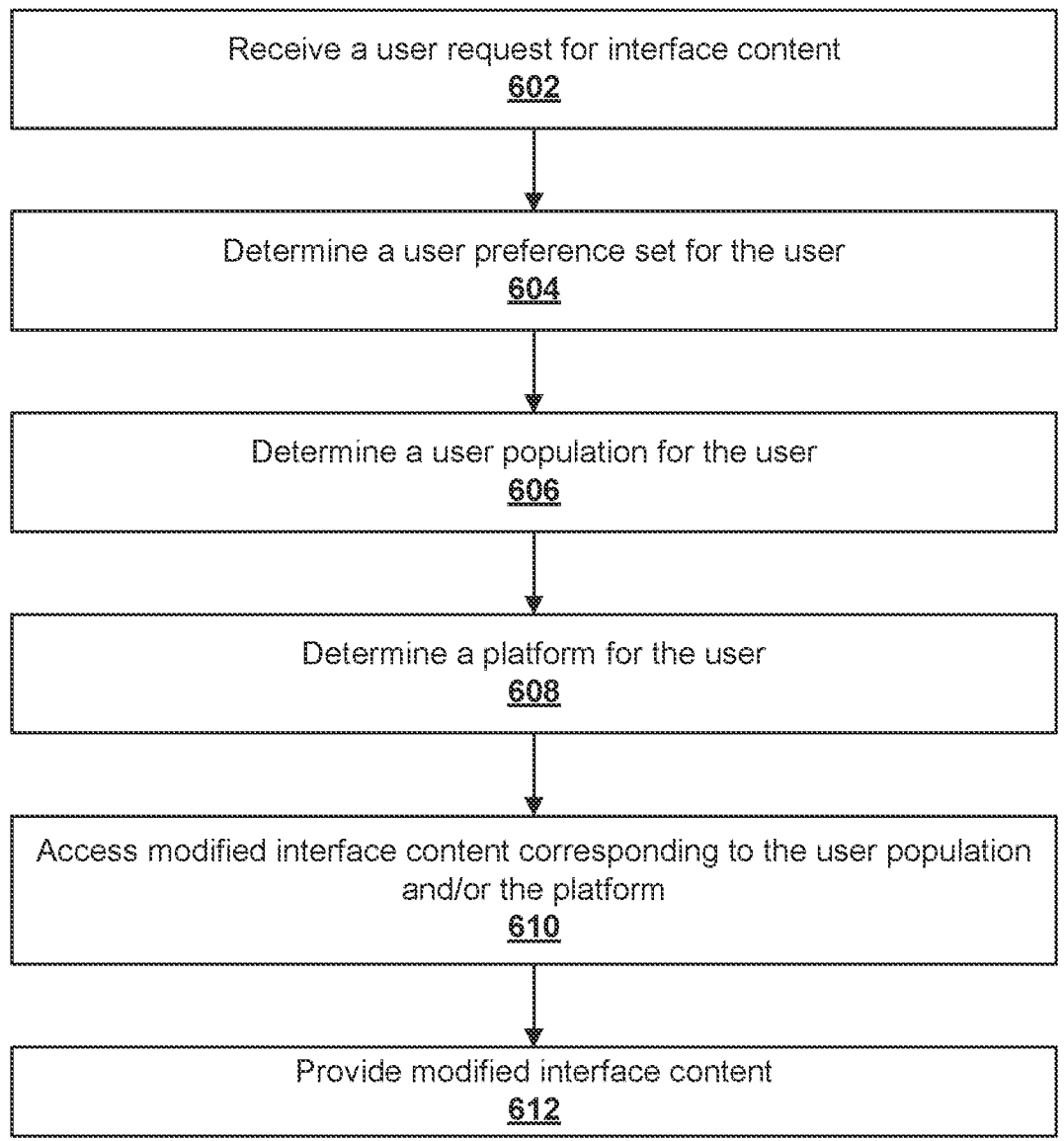
FIG. 6 illustrates an example flowchart for providing modified interface content to a user, in accordance with some example embodiments described herein.

As described in greater detail in FIG. 6, a feature modification model may be trained to learn optimized content components for each user population. Thus, a trained feature modification model of a particular interface feature type may be configured with optimized interface content components for various user populations, including the population of interest. Additionally, the trained feature modification model may be configured with optimized interface content components for various platforms. Said otherwise, an optimized interface content component may refer to an optimized interface content component for a particular user population and a particular platform. The feature modification model may thus determine an optimized interface content component for the user population of interest and/or platform of interest that corresponds to a same interface content component type and/or interface content component subtype as a given interface content component and determine the accessibility score for the interface content component based on an inferred similarity.

The feature modification model may be configured to determine an inferred similarity between the interface content component and an optimized interface content component using any suitable technique. For example, the feature modification model may determine the inferred similarity between the interface content component and the optimized interface content component by comparing corresponding values, parameters, settings, configurations, etc. of the interface content component and the optimized interface content component. In some embodiments, the feature modification model may be configured to apply a technique to determine an inferred similarity based on the interface content component subtype. The feature modification model may use technique such as Euclidean distance, cosine similarity, Pearson correlation, Jaccard index, Hamming distance, Levenshtein distance, Mahalnobis distance, various kernel methods, and/or the like to determine an inferred similarity between the interface content component and an optimized interface content component. The feature modification model may then determine an accessibility score for the interface content component based on the inferred similarity. For example, the feature modification model may be configured to assign a higher accessibility score to a base content component that is inferred to have a higher similarity to the optimized interface content component as compared to an accessibility score for an interface content component inferred to have a lower similarity to the optimized interface content component. Thus, the accessibility score may be indicative of the inferred accessibility for the particular interface content component for the particular user population. An accessibility score may be a value within a predefined accessibility score value range. For example, an accessibility score value range may include values between 0, indicative that the interface content component is entirely inaccessible to the user population of interest, or 100, indicative that the interface content component is completely accessible to the user population of interest.

In some embodiments, the feature modification model may also be configured to detect prohibited interface content components. In some embodiments, certain predefined images, text, layouts, audio settings, and/or other configurations described by interface content components may be prohibited by an organization associated with apparatus 200. The feature modification model may be trained to identify whether an interface content component corresponds to a prohibited interface content components. In an instance the feature modification model determines an interface content component corresponds to a prohibited interface content component, the feature modification model may determine an accessibility score that fails to satisfy an accessibility score threshold. Additionally, in some embodiments, communications hardware 206 may be configured to provide an alert to one or more entity devices (e.g., any one of entity devices 108A-108N), such as the entity device that provided the base interface content, to alert one or more users that the interface content component is prohibited.

As shown by operation 406, the apparatus 200 includes means, such as processor 202, memory 204, analysis circuitry 208, or the like, for determining whether the accessibility score satisfies an accessibility score threshold. Once the analysis circuitry 208 has determined an accessibility score for an interface content component via the feature modification model, the analysis circuitry 208 may determine whether the accessibility score satisfies an accessibility score threshold. An accessibility score threshold may be an accessibility score value that is associated with one or more conditions. An accessibility score may either satisfy or fail to satisfy the accessibility score threshold. For example, an accessibility score may have a value of 60 and an accessibility score threshold may have a value of 70. The conditions associated with the accessibility score threshold may further require that the accessibility score have a value of 70 or greater such that the accessibility score value of 60 would fail to satisfy the accessibility score threshold. As another example, an accessibility score of 70 may be determined to satisfy the accessibility score threshold.

In some embodiments, the accessibility score threshold may be defined by one or more users, such administrative users associated with apparatus 200. Alternatively, the accessibility score threshold may be configured by the particular feature modification model. Additionally, individual accessibility score thresholds for a particular interface content component and/or interface feature set may be defined independently from other individual accessibility score thresholds, thereby allowing for variability and flexibility when evaluating individual interface content components. This may be particularly useful for balancing computational resources expenditure used to modify interface content components with the impact of accessibility of the particular interface content component. For example, some interface content components may have lesser influence on the accessibility of the base interface content and thus, may require a less strict accessibility score threshold. This may aid allow for fewer modifications or no modifications of the interface content components, thereby conserving computational resources. The accessibility score threshold may ensure that resulting interface content components and/or modified interface content components are accessible to the user population of interest using the platform of interest.

In some embodiments, the accessibility score threshold is associated with conditions related to the optimization of the accessibility score of the base content component. In particular, in some embodiments, the accessibility score defines a maximum number of modification iterations the interface content component may undergo, a minimum accessibility score improvement amount between a modified interface content component as compared to a previous interface content component iteration, and/or the like. For example, the accessibility score threshold may define a minimum accessibility score improvement amount of 0.5 and a maximum number of modification iterations of 5 such that if modification of the interface content component results in only a 0.5 value or less improvement in accessibility score within 5 modification iterations, the interface content component is determined to satisfy the accessibility score threshold. If modification of the interface content component results in a value greater than 0.5, the interface content component is determined to fail to satisfy the accessibility score threshold. In this way, the accessibility score threshold may help optimize an interface content component by allowing the interface content component to undergo modification until improvement in the accessibility score is negligible. In this way, the accessibility of the interface content component may be optimized for the user population of interest.

In an instance in which the accessibility score satisfies the accessibility score threshold, the process proceeds to operation 408. As shown by operation 408, the apparatus 200 includes means, such as processor 202, memory 204, analysis circuitry 208, or the like, for maintaining the interface content component. If analysis circuitry 208 determines that the accessibility score of the interface content component satisfies the accessibility score threshold, this may be indicative that the interface content component is currently accessible for the user population of interest. Thus, the interface content component may be maintained and need not undergo initial or further modification.

In an instance in which the accessibility score fails to satisfy the accessibility score threshold, the process proceeds to operation 410. As shown by operation 410, the apparatus 200 includes means, such as processor 202, memory 204, analysis circuitry 208, or the like, for modifying the interface content component. If analysis circuitry 208 determines that the accessibility score for the interface content component fails to satisfy the accessibility score threshold, the analysis circuitry 208 may use the feature modification model to modify the interface content component. The feature modification model may be trained to modify an interface content component based on the interface content component type and/or interface content component subtype associated with the interface content component. In particular, the feature modification model may be trained to modify (e.g., replace, add, remove, or otherwise change) the one or more values, parameters, settings, configurations and/or the like of the interface content component. The feature modification model may be configured to modify the interface content component to improve the similarity of the values, parameters, settings, configurations, etc. between the interface content component and an optimized interface content component and in doing so, may improve the accessibility score for the interface content component.

For example, for an interface content component that is an image and includes values for one or more image pixels, the feature modification model may be configured to modify the values of the one or more image pixels in a manner modifies the pixel values to resemble pixel values of the optimized interface content component. By way of particular example, the feature modification model may be configured to apply image processing techniques to enhance accessibility of the image by applying any suitable image modification techniques (e.g., histogram equalization, gamma correction, sharpening filters, color correction, enhancement, resizing, edge detection, anisotropic diffusion, linear filtering, and/or the like.) This may, for example, increase the contrast of the image such that is it more accessible to low vision user populations.

As yet another example, for an interface content component that is a textbox text that includes various text characters, words, sentences, and paragraphs, the feature modification model may be configured to modify one or more words, sentences, and/or paragraphs in manner that more closely resembles word choices, sentence length, and/or paragraph length of the optimized interface content component. This may, for example, allow the text included in the textbox to be optimally understandable and accessible for user population that may have cognitive disabilities.

As another example, for an interface content component that is a screen reader that include settings such as the reader tone, a reader pitch, a reader volume, a reader speed, and/or other auditory settings, the feature modification model may be configured to modify the values of the one or more settings in a manner that more closely resembles the settings of the screen reader of the optimized interface content component. This may, for example, allow the screen reader to produce audio that is more easily registered and accessible to hearing impaired user populations or user populations who have difficult with audio processing.

As another example, for an interface content component that is a CSS page structure that includes various layout components of an HTML page, such as the position of various website components within a layout, the feature modification model may be configured to modify the position, horizontal size, and/or vertical size of the one or more website components in manner that more closely resembles the positioning and/or sizing of the optimized interface content component. This may, for example, allow the modified interface content to be optimally positioned and sized for the particular platform and for the particular user population, such as low vision user populations.

For example, a first interface feature set may include a textbox text interface content component with first text values and a first font style and a second interface feature set may include the textbox text interface content component with second text values and a second font style. The first interface feature set may be associated with a language interface feature type and the second interface feature set may be associated with a visual interface feature type. In some embodiments, the multimodal model may be configured to weight the first text values higher than the second text values because the multimodal model has been trained to infer that accessibility of text values corresponds more closely to a language interface feature type than a visual interface feature type. Conversely, the multimodal model may be configured to weight the second font style higher than the first font style because the multimodal model has been trained to infer that accessibility of font style corresponds more closely to a visual interface feature type than a language interface feature type.

Returning to FIG. 3, as shown by operation 312, the apparatus 200 includes means, such as processor 202, memory 204, analysis circuitry 208, or the like, for generating modified interface content. Once the analysis circuitry 208 has modified one or more interface content components for each interface feature set, the analysis circuitry 208 may generate modified interface content. In particular, the analysis circuitry 208 may use a multimodal model to generate the modified interface content. The multimodal model may be configured to receive an interface feature set, user population of interest, and/or platform of interest from each feature modification model. The multimodal model may then process the interface content components included in an interface feature set in tandem with the interface content components from other interface feature sets to generate the modified interface content. The produced modified interface content may include one or more interface content components. The modified interface content may include the same number, same interface content component type, and/or same interface content component subtype of interface content components as the base interface content. However, one or more values, parameters, settings, configurations, and/or the like of interface content components included in the modified interface content may be modified as compared to the base interface content. The modified interface content components may be modified in a manner that improves the accessibility of the individual interface content component as well as the modified interface content as a whole. Thus, the modified interface content may be more accessible for the user population of interest for a platform of interest.

In some embodiments, the multimodal model is a deep learning or machine-learning model that is trained to handle different forms of data (e.g., different interface feature types) simultaneously. In some embodiments, the multimodal model may be a neural network (e.g., a CNN, RNN, LSTM, and/or the like), a vision and language model, a large language model, a series of autoencoders, a transformer model, and/or the like.

In some embodiments, the multimodal model may be trained to generate the one or more interface content components for the modified interface content. In particular, in some embodiments, the multimodal model may be configured to apply weights to values, settings, parameters, etc. of the interface content components included in each of the interface feature sets. In this way, the multimodal model may be configured to determine a final value of an interface content component that may be included in multiple interface feature sets. In some embodiments, the multimodal model may be trained to optimize the weights of certain values of an interface content component from a particular feature modification model as compared to an interface content component included in an interface feature set from a different feature modification model.

For example, a first interface feature set may include a textbox text interface content component with first text values and a first font style and a second interface feature set may include the textbox text interface content component with second text values and a second font style. The first interface feature set may be associated with a language interface feature type and the second interface feature set may be associated with a visual interface feature type. In some embodiments, the multimodal model may be configured to weight the first text values higher than the second text values because the multimodal model has been trained to infer that accessibility of text values corresponds more closely to a language interface feature type than a visual interface feature type. Conversely, the multimodal model may be configured to weight the second font style higher than the first font style because the multimodal model has been trained to infer that accessibility of font style corresponds more closely to a visual interface feature type than a language interface feature type. In an instance a value of an interface content component type is non-numerical (e.g., categorical, Boolean, text, and/or the like), the multimodal model may be configured to select the non-numerical value of a content component type based on weight (e.g., select a value for the content component that is associated with the largest weight). In an instance in which a value of an interface content component type is numerical value, the multimodal model may determine a numerical value based on the weights of each interface content component. Alternatively, in some embodiments, the multimodal model may be configured to select the numerical value of the interface content component with the largest weight.

Figure 7:
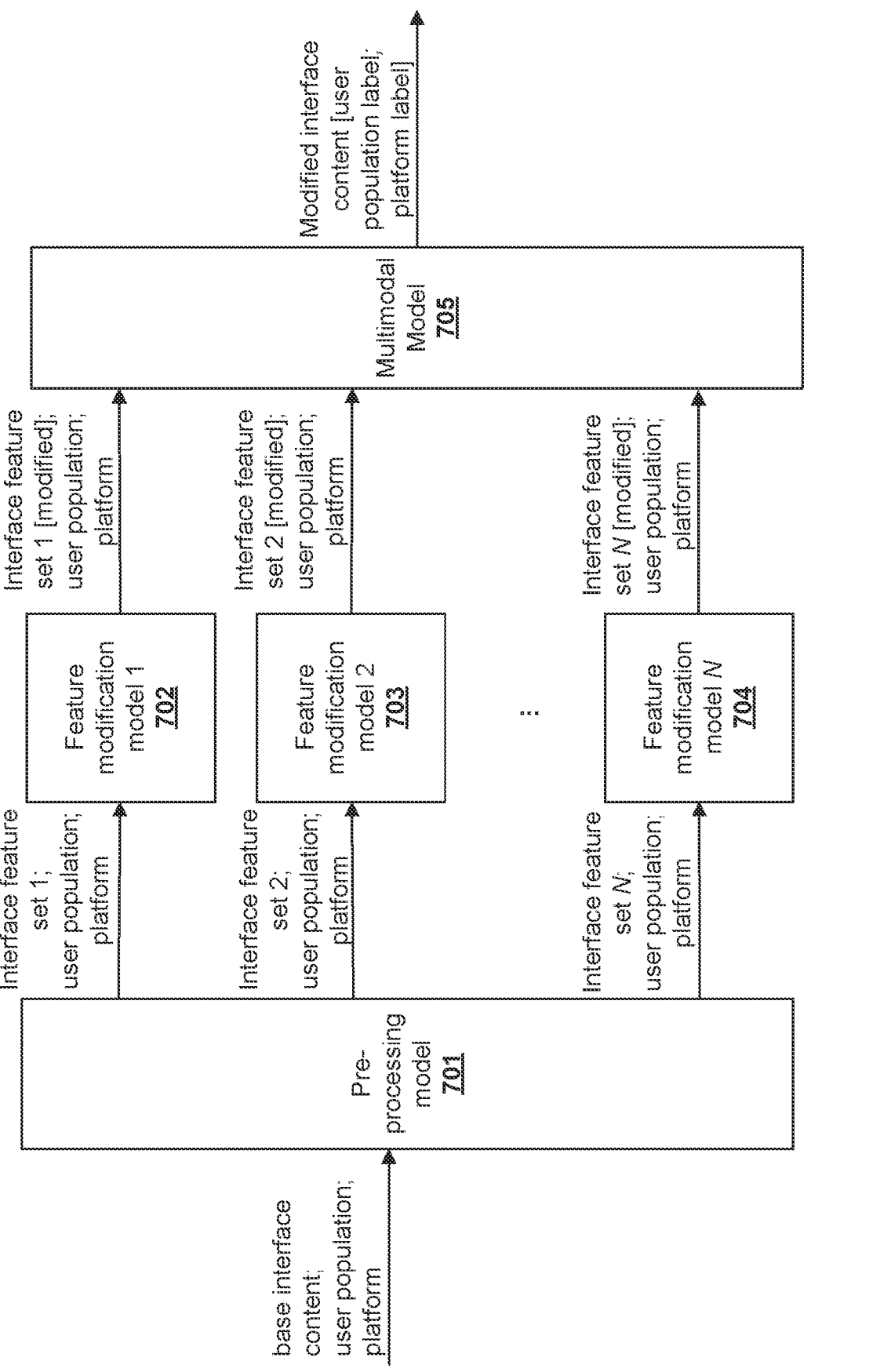
FIG. 7 illustrates an example machine learning model framework, as used in accordance with some embodiments described herein.

FIG. 7 illustrates an example machine learning model framework that may be used in example embodiments. As shown in FIG. 7, a pre-processing model 701 may receive base interface content, a user population of interest, and a platform of interest. The pre-processing model 701 may generate one or more interface feature sets which are each associated with a particular interface feature type. The pre-processing model may provide the interface feature set corresponding to a particular interface feature type, the user population of interest, and the platform of interest to a feature modification model 702, 703, or 704 that is associated with an interface feature type corresponding to the interface feature type of the interface feature set. Each of feature modification models 702, 703, and 704 may modify one or more interface content components and provide the interface feature set, the user population of interest, and the platform of interest to multimodal model 705. Multimodal model 705 may process each of the interface feature sets to generate the modified interface content. Additionally, the modified interface content may be assigned a user population label indicative of the user population of interest for which the modified interface content was generated. The modified interface content may also be assigned a platform label indicative of the platform of interest for which the modified interface content was generated.

Returning now to FIG. 3, as shown by operation 314, the apparatus 200 includes means, such as processor 202, memory 204, analysis circuitry 208, or the like, for labeling the modified interface content with a user population label and/or platform label. Once the analysis circuitry 208 has generated the modified interface content, the analysis circuitry 208 may label the generated modified interface content with a user population label and a platform label. The user population label may be indicative of the user population of interest for which the modified interface content was generated. The platform label may be indicative of the platform of interest for which the modified interface content was generated. In this way, the modified interface content may be labelled with the corresponding user population label and platform label such that the analysis circuitry 208, and/or other circuitry, may determine the user population and platform for which the modified interface content is accessible for.

As shown by operation 316, the apparatus 200 includes means, such as processor 202, memory 204, communications hardware 206, or the like, for providing the modified interface content. In some embodiments, once the analysis circuitry 208 has generated the modified interface content and has labelled the modified interface content with the user population label and/or platform label, the analysis circuitry 208 may provide the modified interface content. The modified interface content may be stored with all the interface content components such that the modified interface content, when accessed from storage, may be executable and/or may cause the interface content components to be rendered on an associated display.

In some embodiments, the analysis circuitry 208 may provide the modified interface content to an associated interface content storage repository 110. The interface content storage repository 110 may be configured to store the modified interface content with the user population label and/or platform label. In some embodiments, the interface content storage repository 110 may be configured to store modified interface content generated from a particular base interface content in a common storage location (e.g., a same storage folder, library, drive, and/or the like). Additionally, in some embodiments, the analysis circuitry 208 may link the modified interface content to a particular endpoint or URL. In this way, multiple modified interface content may be linked to a common endpoint or URL and thus, modified interface content determined to be most accessible for a user may be presented to a user, as will be discussed in greater detail in FIG. 6.

As described above, it will be appreciated that operations 304-316 may be repeated for each user population of interest and/or each platform of interest. In this way, modified interface content may be generated and provided for each combination of user population and platform, thereby allowing for a robust and comprehensive collection of modified interface content. As described in more detail in FIG. 6, this allow for apparatus 200 to provide modified interface content that is optimized for the individual user and the platform by which the user is accessing the modified interface content, thereby allowing for enhanced accessibility of the modified interface content.

Figure 8:
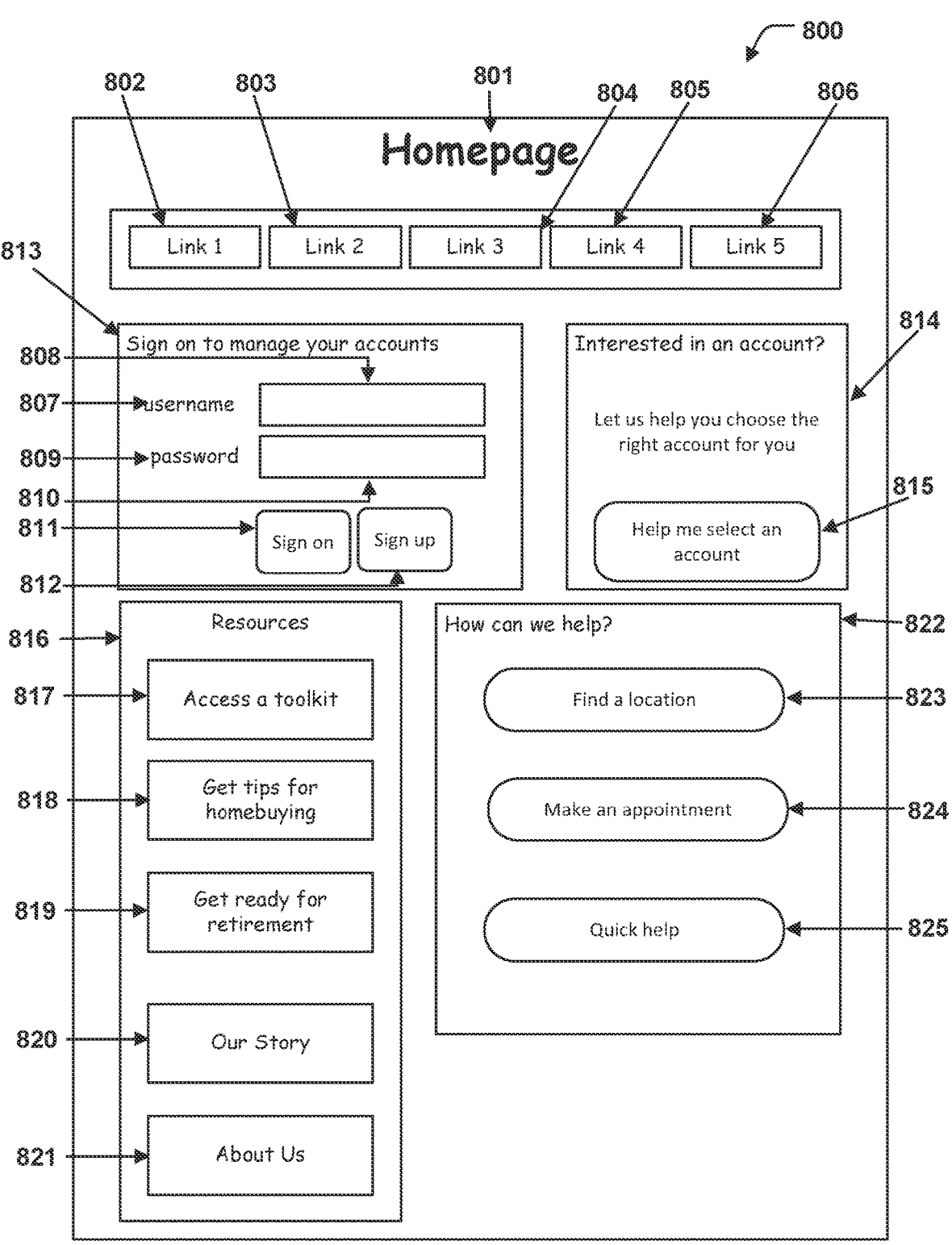
FIG. 8 illustrates an example user interface depicting base interface content as used in some example embodiments described herein.
Figure 9:
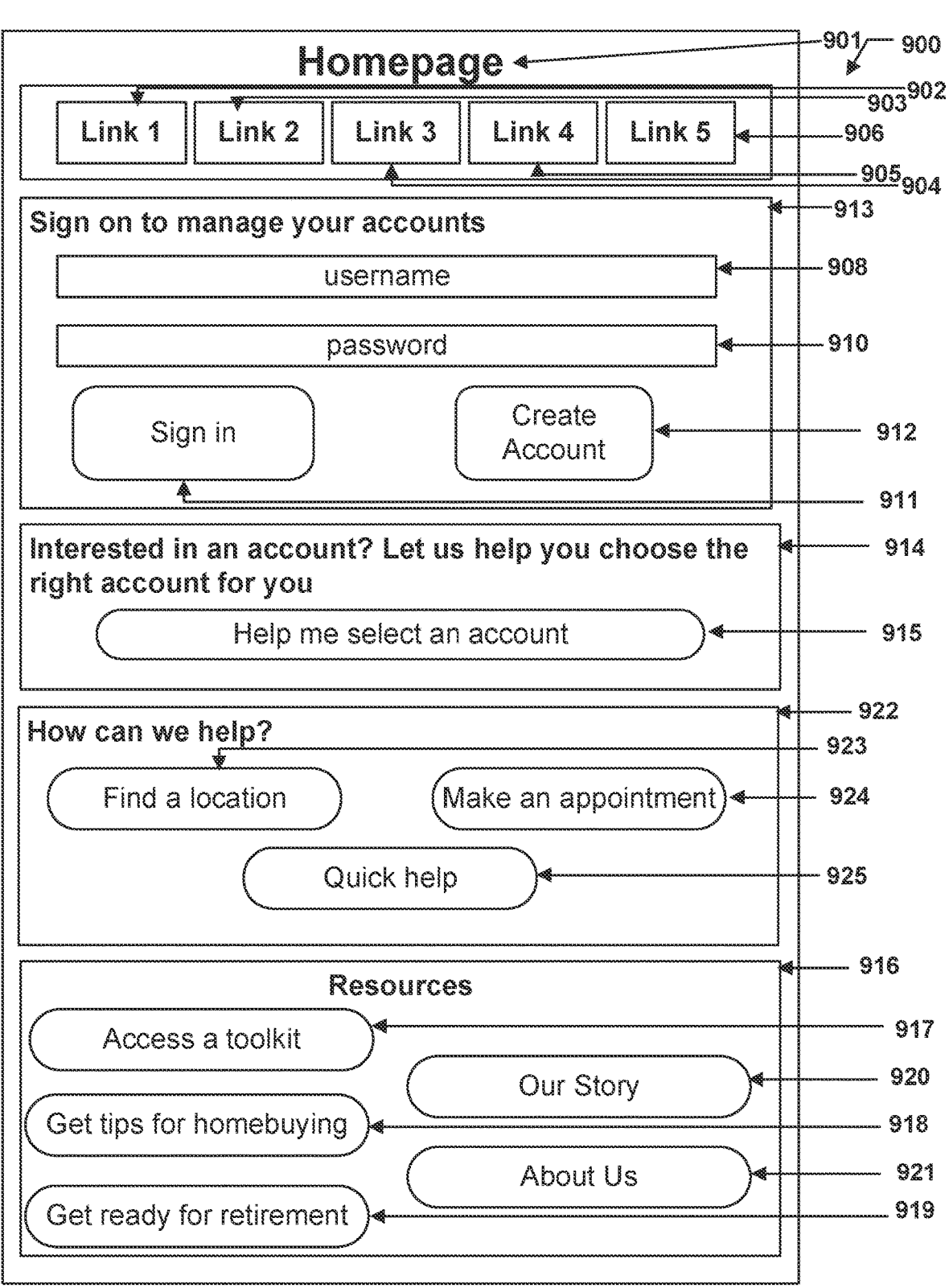
FIG. 9 illustrates an example user interface depicting modified interface content as used in some example embodiments described herein.

As an illustrative example of how modified interface content provides enhanced accessibility as compared to base interface content, FIG. 8 provides an example graphic user interface (GUI) depicting base interface content and FIG. 9 provides an example GUI depicting modified interface content. As noted previously, a user may interact with the interface content generation system 102 by directly engaging with communications hardware 206 of an apparatus 200. In such an embodiment, the GUI shown in FIG. 8 or 9 may be displayed to a user by the apparatus 200. Alternatively, a user may interact with the interface content generation system 102 using a separate user device (e.g., any of user devices 106A-106N, as shown in FIG. 1), which may communicate with the interface content generation system 102 via communications network 104. In such an embodiment, the GUI shown in FIG. 8 or FIG. 9 may be displayed to the user by the user device or via an associated display.

Turning first to FIG. 8, a GUI depicting base interface content 800 is depicted. The base interface content 800 includes interface content components 801, 802, 803, 804, 805, 806, 807, 808, 809, 810, 811, 812, 813, 814, 815, 816, 817, 818, 819, 820, 821, 822, 823, 824, and 825. It will be appreciated that additional interface content components may be defined for base interface content 800. Each base interface content component is associated with values, parameters, settings, configurations and/or the like. For example, interface content component 807 may be a textual interface content component type that is associated with comic sans font style, 10 font size, and the text characters "username". Additionally, the text interface content component 807 may assigned a particular position within the base interface content 800. As another example, interface content component 808 may be an interactivity interface content component type that is associated with an interaction textbox height, an interaction textbox width, and a position within the base interface content 800. As seen in base interface content 800, the font style of comic sans and small font size for the text may be difficult and hard to read for users, and particularly for users who are vision impaired. Additionally, the position of interaction elements, such as interface content component 811 and 812 may be spaced close together such that users that lack fine motor control may find it difficult to select the desired option. Additionally, the text of "sign on" for interface content component 811 may be confused with the similar text of "sign up" for interface content component 812 such that users may accidentally interact with the incorrect interface content component. Furthermore, interface content components 817-821 lack shape consistency with other interface content components, such as 811-812, 816, and 823-825. This may be distracting for some users such that user navigation of base interface content 800 is impaired.

Now turning to FIG. 9, a GUI depicting modified interface content 900 is depicted. The modified interface content 900 may be associated with a low vision user population and a mobile application platform. It will be appreciated that modified interface content generated for a different user population and/or platform may appear differently than modified interface content 900. The modified interface content 900 may be generated based on base interface content 800. Modified interface content 900 includes interface content components 901, 902, 903, 904, 905, 906, 908, 910, 911, 912, 913, 914, 915, 916, 917, 918, 919, 920, 921, 922, 923, 924, and 925. It will be appreciated that additional interface content components may be defined for modified interface content 900. Each modified interface content component is associated with values, parameters, settings, configurations and/or the like. Additionally, the modified interface content components may be a modified version of a corresponding base interface content component whose value, parameter, setting, configuration, etc. has been modified. For example, interface content component 908 may be an interactivity interface content component type that is associated with an interaction textbox height, an interaction textbox width, and a position within the modified interface content 900. The interface content component 908 may be a modified version of interface content component 808. In particular, interface content component 908 may have a greater interaction textbox width to increase the ease of user interaction with the interface content component. Additionally, interface content component 807 may have been removed in favor of including the text in the interface content component 908. As seen in modified interface content 900, the font style of Arial and larger font size for the text may improve the accessibility of the text for users that are vision impaired. Additionally, the position of interaction elements, such as interface content component 911 and 912 may be spaced further apart such that users that may have difficult viewing the boundaries of the interface content components may more easily interact with the interaction elements to select the desired option. Additionally, the text of "sign in" for interface content component 911 may be more easily distinguished form the text of "create account" for interface content component 912, thereby allowing for easier and more intuitive user navigation. Furthermore, the interface content components of the modified interface content 900 may have a common theme and consistency which may allow for streamlined user interactions.

Example Operations for Training Machine Learning Models

Turning to FIG. 5, example operations are shown for training a feature modification model and/or a multimodal model. As shown by operation 502, the apparatus 200 includes means, such as processor 202, memory 204, evaluation circuitry 210, or the like, for identifying a training interface content set. In some embodiments, the evaluation circuitry 210 may identify a training interface content set. A training interface content set may include a plurality of training interface content. Training interface content may include one or more training interface content components. The structure of training interface content may be similar to the base interface content described in FIGS. 4-5. Additionally, the structure and/or format of the training interface content components may be similar to the interface content components described in FIGS. 4-5.

Additionally, each training interface content includes at least one unique training interface content component. In this way, each training interface content included in the training interface content set is unique in at least one respect. This may allow for variability within the individual training interface content. As will be described in greater detail below, this variability allows for a robust user performance training set that may be used to train feature modification models and/or multimodal models. Additionally, this variability allows the models to infer which interface content components affect the accessibility of interface content and the magnitude of the impact of interface content components. The training interface content component differences also may reveal trends or other patterns of user preferences for interface content components within user populations.

In some embodiments, the training interface content is generated manually by one or more users. In some embodiments, the training interface content is automatically generated using a training interface content generation models. A training interface content generation model may be a machine learning model that is configured to receive an initial training interface content with training interface content components and modify one or more values, parameters, settings, configurations, and/or the like for at least one training interface content component to generate another training interface content. In some embodiments, the training interface content generation model is a machine-learning model, such as a GAN. The training interface content generation model may allow training interface content to be generated in a way that reduces the manual burden on users for manually modifying individual training interface content components.

As shown by operation 504, the apparatus 200 includes means, such as processor 202, memory 204, communications hardware 206, evaluation circuitry 210, or the like, for providing the training interface content to a user. In some embodiments, the evaluation circuitry 210 may provide one or more training interface content to the communications hardware 206. The communications hardware 206 may provide the training interface content to a user device (e.g., any one of user devices 106A-106N).

In some embodiments, the communications hardware 206 may provide two or more training interface content to the user device at one time. This may cause the provided training interface content to be rendered or displayed to the user via the user device and/or another associated display.

Alternatively, the communications hardware 206 may provide only a single training interface content at a time. In some embodiments, the evaluation circuitry 210 may additionally provide a test prompt to the user. The test prompt may relate to the provided training interface content. For example, the test prompt may provide instructions to the user that direct them to perform a task. By way of particular example, the test prompt may direct the user to select a first navigation link (e.g., corresponding to a navigation interface content component type). The test prompt may be rendered on the user device such that the user may read the test prompt and/or may be audibly output to the user via the user device.

Additionally, the user provided with the training interface content may be associated with a user preference set. The user preference set may be indicative of one or more known user preferences for the user. A user preference may be a configuration, setting, parameter, option, and/or the like that is associated with an inferred preferred preference for the corresponding user. Additionally, the user preference set may be indicative of one or more impairments, difficulties, disabilities and/or the like of the user. For example, the user preference set may be indicative of a user preference on using a screen reader (e.g., enabled or not enabled), audio settings for a screen reader if enabled (e.g., a preferred audio gain, audio volume, audio speed, audio pitch, audio tone, and/or the like). Alternatively, a user may be unsure of his/her preferences and the user preference set may instead include only known impairments, difficulties, disabilities, etc. For example, a user preference set may be indicative that the user has low vision sensitivity. However, the user may be unsure of what visual settings he/she prefers.

Furthermore, the user may be provided the training interface content on a particular platform (e.g., web browser, mobile application, desktop application, and/or the like). The evaluation circuitry 210 may additionally determine the type of platform to which the training interface content is provided.

As shown by operation 506, the apparatus 200 includes means, such as processor 202, memory 204, communications hardware 206, evaluation circuitry 210, or the like, for receiving a user response to training interface content. Once the training interface content is provided to the user via a user device (e.g., any one of user devices 106A-106N), the communications hardware 206 may receive a user response from the user via the user device. The user response may be provided in response to detection of user input received from the user.

In some embodiments, the user response may be a selection of at least one training interface content from the user who is presented with two or more training interface content. For example, the user may be presented with two or more training interface content and the test prompt may direct the user to select the displayed training interface content they prefer. The user may then provide user input to select (e.g., click, tap, audibly select, and/or the like) the displayed training interface content option that the user prefers. In some embodiments, the user response may be indicative of multiple selections of training interface content in an instance in which the user was presented with multiple rounds of training interface content presentation.

In some embodiments, the user response may be one or more user inputs that the user made in order to attempt to satisfy the test prompt. The user response may additionally indicate the time window from the time the test prompt was presented to the user to when the user performed the requested action. Thus, the user response may include any erroneous user inputs, which may indicate the user experienced difficulty when attempting to perform the requested test prompt. For example, if the navigation interface content components are too close together, the user may accidentally select an incorrect navigation interface content component instead of the desired navigation interface content component. Additionally, the time window may be indicative of the level of complexity experienced by the user when navigating the training interface content to perform the test prompt. As another example, the user may experience difficult completing the test prompt because the training interface content was unclear and thus, the time window for completion may be a longer duration than an expected duration. In some embodiments, a time window threshold may also be exceeded such that the user response may indicate that the user failed to complete the test prompt within the time window threshold. These difficulties may in some cases, be attributed to accessibility difficulties experienced by the user with respect to the particular training interface content. Additionally, or alternatively, these difficulties may be attributed or compounded by the particular platform used to access the training interface content.

Additionally, in some embodiments, the user response may include user feedback with respect to the training interface content. The user feedback may be indicative of user preferences with respect to the training interface content, such as user sentiment (e.g., positive, negative, neutral) to various training interface content components. In this way, the user may provide his/her own feedback in the form of selection of predefined feedback options or as freeform user feedback.

As shown by operation 508, the apparatus 200 includes means, such as processor 202, memory 204, evaluation circuitry 210, or the like, for generating a user performance score for training interface content. In some embodiments, the evaluation circuitry 210 may generate a user performance score for the training interface content presented to the user. In some embodiments, the evaluation circuitry 210 may generate the user performance score for a user who was presented training interface content and assigned task via a test prompt. In some embodiments, the evaluation circuitry 210 may be configured to use a performance scoring model to generate the user performance score.

The performance scoring model may be a machine learning model or rules-based model that is configured to process a user response for a training interface content and generate a user performance score based on the user response. In particular, the performance scoring model may be configured with an expected duration of time, an expected number of user input selections, and/or the like for each test prompt. The expected values may be manually configured or may be based on an average determined across a diverse group of users. Additionally, the expected values may be associated with a standard deviation determined across the diverse group of users. The performance scoring model may compare the user response from a particular user for a training interface content as compared to respective expected values. For example, the performance scoring model may compare a time window in which the user completed the test prompt to an expected time window. The performance scoring model may then generate a user performance score based on a magnitude of deviation of the user response as compared to the expected value and/or standard deviation. The user performance score may be indicative of how well the user performed as compared to an average user.

As shown by operation 510, the apparatus 200 includes means, such as processor 202, memory 204, evaluation circuitry 210, or the like, for generating a user performance training set. Once the user response has been received, the evaluation circuitry may generate a user performance training set. The user performance training set may include the training interface content, the user preference set corresponding to the user, the platform used, and the user response received from the user. In some embodiments, the user performance training set may further include the user performance score and the one or more corresponding test prompts.

In some embodiments, the evaluation circuitry 210 may store the user performance training set in an associated storage, such as memory 204. The user performance training set may be accessible from the associated storage such that it may be subsequently used to train one or more models, such as feature modification models and/or a multimodal models.

Optionally, as shown by operation 512, the apparatus 200 includes means, such as processor 202, memory 204, training circuitry 212, or the like, for training a feature modification model based on the user performance training set. In some embodiments, the training circuitry 212 may be configured to access the user performance training set along with one or more other user performance training sets associated with other users and train a feature modification model based on the user performance training sets. In particular, the training circuitry 212 may provide the user performance training sets to an untrained feature modification model such that it may be trained to optimize one or more parameters based on the user performance training sets.

In some embodiments, the training circuitry 212 may be configured to determine one or more user populations based on the user performance training sets. The one or more platforms may be a defined set of known platforms such that this clustering is not needed for platforms. In particular, the training circuitry 212 may be configured to determine one or more user populations and a corresponding user population preference set for each user population. A user population preference set may be include one or more user population preferences. A user population preference may be a configuration, setting, parameters, options, and/or the like that are associated with an inferred preferred preference for a corresponding user population. In particular, a user population preference set may be representative of preferred configurations, settings, parameters, etc. for users included within a particular user population. Although illustrative examples are provided herein, it will be appreciated that any number of user populations with various levels of granularity can be contemplated. Furthermore, users included in a user population need not have a uniform medical diagnosis and may simply have similar preferences such that the individual user is included within a user population. By way of example, a user may be included in a low visibility user population due to his/her preferences that are similar to users with low visibility but may not themselves experience visual impairment.

In some embodiments, the training circuitry 212 may be configured to determine one or more user populations by clustering users based on his/her user preferences and/or user responses. The training circuitry 212 may be configured to use any suitable clustering algorithm to determine the one or more user populations, such as K-means clustering, hierarchical clustering, density-based spatial clustering of applications with noise (DBSCAN), mean shift clustering, spectral clustering, Gaussian mixture model (GMM), ordering points to identify the clustering structure (OPTICS), and/or the like. In this way, the training circuitry 212 may be configured to define user populations in a flexible manner that takes into consideration explicit user preferences (e.g., as indicated by the user preference set) and inferred user preferences (e.g., as indicated based on the user response). In this way, users may be assigned into a user population based on user preference rather than based on a uniform medical diagnosis. This allows for flexibility in the user population and results in an improved and accessible modified interface content for all users.

Once the training circuitry 212 has determined the one or more user populations, the training circuitry 212 may provide an indication of the user populations as well as an assigned user population for each of the user performance training sets to the feature modification model. In this way, all feature modification models may be provided with the same possible user populations and may be configured to analyze user performance training sets for users within a given user population. This allows the feature modification model to optimize parameters for each individual user population and/or each platform.

Optionally, as shown by operation 514, the apparatus 200 includes means, such as processor 202, memory 204, training circuitry 212, or the like, for training a feature modification model based on the user performance training set. In some embodiments, the training circuitry 212 may train the multimodal model using the user performance training set. In some embodiments, the multimodal model may be trained in a similar manner as described in operation 512.

Example Operations for Providing Accessible Modified Interface Content

Turning to FIG. 6, example operations are shown for providing modified interface content to a user. As shown by operation 602, the apparatus 200 includes means, such as processor 202, memory 204, communications hardware 206, or the like, for receiving a user request for interface content. In some embodiments, the communications hardware 206 may receive a user request for interface content from a user device (e.g., any one of user devices 106A-106N). In some embodiments, the user request is any request for access to interface content stored and/or maintained by apparatus 200. Additionally, the user request may include an endpoint or URL for the requested interface content. For example, a user may attempt to access a particular webpage via his/her user device, which may cause a hypertext transfer protocol (HTTP) request to be received by the communications hardware 206.

Additionally, the user request may include a device identification number, such as a media access control (MAC) address, an international mobile equipment identity (IMEI), an electronic serial number, a mobile equipment identifier, a unique device identifier, and/or the like. The user request may also include an indication of the particular platform the user is requesting to access the interface content from. For example, the platform may be a web browser, a native mobile application, a desktop application, and/or the like.

In some embodiments, the user request may be associated with a particular user account. A user account may uniquely identify a user and may further include a user preference set for the user. In some embodiments, the user may be required to log-in to his/her user account using an associated set of user credentials. Once logged in, future requests received by the communications hardware 206 may include an indication of the user account (e.g., an associated user account number, username, email address, and/or the like).

In some embodiments, the user request may be indicative that the user is not associated with a user profile. The user request may include a user preference set for the user and/or user device. This user preference set may be used to facilitate interaction with the particular user device without requiring the user to create a user account.

As shown by operation 604, the apparatus 200 includes means, such as processor 202, memory 204, analysis circuitry 208, or the like, for determining a user preference set for the user. In response to the receiving the user request for interface content, the analysis circuitry 208 may be configured to determine a user preference set for the user. In some embodiments, the user preference set may be stored in an associated user profile for the user such that the analysis circuitry 208 may access the user profile of the user to determine the user preference set.

In some embodiments, prior to a user logging into his/her user account, the analysis circuitry 208 may determine a user profile that is associated with the device identifier included in the user request. Thus, the analysis circuitry 208 may determine the user preference set for the user prior to the user logging in. In this way, the user may be presented with accessible content from the beginning of his/her interaction with the interface content.

The user preference set of the user may be generated for the user in response to user preference selections made by the user. Additionally, or alternatively, the user preference set for the user may be made in response to received user responses to training interface content, as described in FIG. 5. Once generated, the user preference set may be stored in an associated user profile for the user.

As described above, in some embodiments, the user may not be associated with a user profile. In an instance in which the user request provides a user preference set, the analysis circuitry 208 may determine the user preference set using the user request. Alternatively, in an instance in which the user is not associated with a user profile and the user request does not provide a user preference set, the analysis circuitry 208 may determine a default user preference set as the user preference set for the user. The default user preference set may include one or more default user preferences. A default user preference may be a configuration, setting, parameter, options and/or the like that is preferred by a majority of users. For example, the analysis circuitry 208 may analyze a particular user preference across various users and/or user populations to determine the most preferred configuration, setting, parameter, option, etc. for the user preference and may assign this as the default user preference.

As shown by operation 606, the apparatus 200 includes means, such as processor 202, memory 204, analysis circuitry 208, or the like, for determining a user population for the user. The analysis circuitry 208 may also determine a user population to which the user corresponds. In some embodiments, the user profile may additionally include an indication of the user population to which the user corresponds. In some embodiments, the analysis circuitry 208 may be configured to determine the user population for which the user corresponds periodically and/or in response to updates made in the user preference set of the user and/or updating user performance training data. In this way, the user population assigned and determined for the user may be up to date and accurate. In some embodiments, the analysis circuitry 208 may determine a user population for the user in real-time or near real-time.

To determine a user population for the user, the analysis circuitry 208 may be configured to compare the user preference set for the user to user population preference sets associated with different user populations. The analysis circuitry 208 may be configured to determine the user population for the user as the user population that shares a user population preference set that is most similar to the user preference set. In some embodiments, the analysis circuitry 208 may be configured to apply one or more similarity techniques to determine the user population for the user. For example, the analysis circuitry 208 may use techniques such as Euclidean distance, cosine similarity, Pearson correlation, Jaccard index, Hamming distance, Levenshtein distance, Mahalnobis distance, various kernel methods, and/or the like to determine an inferred similarity between a particular user population preference set and the user preference set. Additionally or alternatively, the analysis circuitry 208 may be configured to use any suitable clustering algorithm to determine the user population for the user, such as K-means clustering, hierarchical clustering, DBSCAN, mean shift clustering, spectral clustering, GMM, OPTICS, and/or the like.

As shown by operation 608, the apparatus 200 includes means, such as processor 202, memory 204, analysis circuitry 208, or the like, for determining a platform for the user. The analysis circuitry 208 may further determine the platform for the user. The analysis circuitry 208 may determine the platform for the user based on the platform indicated in the user request. For example, the platform may be a web browser, a native mobile application, a desktop application, and/or the like.

As shown by operation 610, the apparatus 200 includes means, such as processor 202, memory 204, communications hardware 206, analysis circuitry 208, or the like, for accessing modified interface content corresponding to the user population and/or platform. Once the analysis circuitry 208 has determined the user population and/or platform, the analysis circuitry 208 may determine a corresponding user population label for the user population and a corresponding platform label for the platform. The analysis circuitry 208 may then access the modified interface content that corresponds to the endpoint or URL indicated in the user request and that is labelled with the corresponding user population label and/or platform label. In particular, the analysis circuitry 208 may access the interface content storage repository 110 to retrieve the modified interface content that is associated with the requested URL or endpoint and that is labelled with the user population label and/or platform label. This modified interface content may be the content interface provides optimal accessibility for the particular platform and based on the user's preferences.

As shown by operation 612, the apparatus 200 includes means, such as processor 202, memory 204, communications hardware 206, or the like, for providing the modified interface content. Once the analysis circuitry 208 has accessed the modified interface content, the communications hardware 206 may provide the modified interface content to the user via the requesting user device (e.g., any one of user devices 106A-106N). In some embodiments, the communications hardware 206 may provide the modified interface content in an HTTP response. Provision of the modified interface content may cause the interface content components of the modified interface content be rendered on the user device and/or an associated display such that the modified interface content is viewable and accessible to the user via his/her user device.

FIGS. 3-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved user accessibility of digital content. Example embodiments thus provide tools that overcome the problems faced by conventional accessibility evaluation standards that fail to take into account user preferences or distinguish between digital content presented on different technology platforms. As such, example embodiments described herein do away with the conventional one-size-fits-all approach of conventional standards and allow for the provision of interface content that is tailored to the accessibility preferences of the individual user. Furthermore, example embodiments described herein contemplate generating modified interface content that is optimized for various technology platforms (e.g., web content, native mobile applications, desktop applications, etc.). In this way, the interface content may be presented to the user in an accessible manner regardless of the technology platform the user is using the access the interface content.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing accessible interface content, the method comprising:

receiving, by communications hardware, base interface content comprising one or more interface content components;

determining, by analysis circuitry, a user population of interest;

generating, by the analysis circuitry and using a pre-processing model, one or more interface feature sets, wherein (a) each interface feature set comprises one or more interface content components and (b) each interface feature set is associated with an interface feature type;

for an interface feature set, modifying, by the analysis circuitry and using one or more feature modification models, one or more of the one or more interface content components of the interface feature set based on the user population of interest;

generating, by the analysis circuitry and using a multi-modal model and based on the one or more interface feature sets and the user population of interest, modified interface content comprising one or more modified interface content components; and providing, by the communications hardware, the modified interface content.

2. The method of claim 1, further comprising, for each interface feature set:

identifying, by the analysis circuitry and using the pre-processing model, a feature modification model that corresponds to the interface feature type of the interface feature set; and modifying, by the analysis circuitry and using the identified feature modification model and based on the user population of interest, one or more of the one or more interface content components of the interface feature set.

3. The method of claim 1, further comprising, for each interface feature set:

determining, by the analysis circuitry and using a feature modification model, an accessibility score for an interface content component included in the interface feature set based on the user population of interest;

determining, by the analysis circuitry and using the feature modification model, whether the accessibility score satisfies an accessibility score threshold; and in an instance in which the accessibility score fails to satisfy the accessibility score threshold, modifying, by the analysis circuitry, the interface content component.

4. The method of claim 1, further comprising;

determining, by the analysis circuitry, a platform of interest, wherein modifying the one or more interface content components of the interface feature set is further based on the platform of interest.

5. The method of claim 1, further comprising;

determining, by the analysis circuitry, a platform of interest, wherein generating the modified interface content is further based on the platform of interest.

6. The method of claim 1, further comprising:

identifying, by evaluation circuitry, a training interface content set comprising a plurality of training interface content, wherein (a) each training interface content comprises one or more training interface content components and (b) each training interface content comprises at least one unique training interface content component;

providing, by the communications hardware, training interface content to a user, wherein the user is associated with a user preference set; and receiving, by the communications hardware, a user response to the provided training interface content.

7. The method of claim 6, further comprising:

generating, by the evaluation circuitry, a user performance training set comprising (i) the training interface content, (ii) the user preference set, and (iii) the user response; and training, by training circuitry, a feature modification model based on the user performance training set.

8. The method of claim 7, further comprising:

generating, by the evaluation circuitry and based on the user response, a user performance score for each training interface content for the user, wherein generating the user performance training set further comprises the user performance score.

9. The method of claim 6, further comprising:

generating, by the evaluation circuitry, a user performance training set comprising (i) the training interface content, (ii) the user preference set, and (iii) the user response; and training, by training circuitry, the multimodal model based on the user performance training set.

10. The method of claim 9, further comprising:

generating, by the evaluation circuitry and based on the user response, a user performance score for each training interface content for the user, wherein generating the user performance training set further comprises the user performance score.

11. The method of claim 1, further comprising labelling, by the analysis circuitry, the modified interface content with at least one of (a) a user population label based on the user population of interest or (b) a platform label based on a platform of interest.

12. The method of claim 1, wherein each interface feature type comprises an audio interface feature type, a visual interface feature type, or a language interface feature type.

13. An apparatus for providing accessible interface content, the apparatus comprising:

communications hardware configured to:

receive base interface content comprising one or more interface content components; and analysis circuitry configured to:

determine a user population of interest, generate, using a pre-processing model, one or more interface feature sets, wherein (a) each interface feature set comprises one or more interface content components and (b) each interface feature set is associated with an interface feature type, for an interface feature set, modify, using one or more feature modification models, one or more of the one or more feature modification models, one or more of the one or more interface content components of the interface feature set based on the user population of interest, and generate, using a multimodal model and based on the one or more interface feature sets and the user population of interest, modified interface content comprising one or more modified interface content components;

wherein the communications hardware is further configured to provide the modified interface content.

14. The apparatus of claim 13, wherein the analysis circuitry is further configured to, for each interface feature set:

identify, using the pre-processing model, a feature modification model that corresponds to the interface feature type of the interface feature set; and modify, using the identified feature modification model and based on the user population of interest, one or more of the one or more interface content components of the interface feature set.

15. The apparatus of claim 13, wherein the analysis circuitry is further configured to, for each interface feature set:

determine, using a feature modification model, an accessibility score for an interface content component included in the interface feature set based on the user population of interest;

determine, using the feature modification model, whether the accessibility score satisfies an accessibility score threshold; and in an instance in which the accessibility score fails to satisfy the accessibility score threshold, modify the interface content component.

16. The apparatus of claim 13, wherein the analysis circuitry is further configured to:

determine a platform of interest, wherein modifying the one or more interface content components of the interface feature set is further based on the platform of interest.

17. The apparatus of claim 13, wherein the analysis circuitry is further configured to:

determine a platform of interest, wherein generating the modified interface content is further based on the platform of interest.

18. The apparatus of claim 13, further comprising evaluation circuitry configured to identify a training interface content set comprising a plurality of training interface content, wherein (a) each training interface content comprises one or more training interface content components and (b) each training interface content comprises at least one unique training interface content component;

wherein the communications hardware is further configured to:

provide training interface content to a user, wherein the user is associated with a user preference set, and receive a user response to the provided training interface content.

19. The apparatus of claim 13, wherein the analysis circuitry is further configured to label the modified interface content with at least one of (a) a user population label based on the user population of interest or (b) a platform label based on a platform of interest.

20. A computer program product for providing accessible interface content, the computer program product comprising at least one non-transitory computer-readable storage medium storing software instructions that, when executed, cause an apparatus to:

receive base interface content comprising one or more interface content components;

determine a user population of interest;

generate, using a pre-processing model, one or more interface feature sets, wherein (a) each interface feature set comprises one or more interface content components and (b) each interface feature set is associated with an interface feature type;

for an interface feature set, modify, using one or more feature modification models, one or more of the one or more interface content components of the interface feature set based on the user population of interest;

generate, using a multimodal model and based on the one or more interface feature sets and the user population of interest, modified interface content comprising one or more modified interface content components; and provide the modified interface content.

\* \* \* \* \*